US009733880B2

(12) United States Patent
Levesque et al.

(10) Patent No.: US 9,733,880 B2
(45) Date of Patent: Aug. 15, 2017

(54) HAPTIC NOTIFICATION MANAGER

(71) Applicant: Immersion Corporation, San Jose, CA (US)

(72) Inventors: Vincent Levesque, Montreal (CA); Danny Grant, Laval (CA); Jean-Francois Blanchard-Dionne, Outremont (CA); Amaya Becvar Weddle, San Jose, CA (US); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 97 days.

(21) Appl. No.: 14/291,735

(22) Filed: May 30, 2014

(65) Prior Publication Data
US 2015/0347075 A1 Dec. 3, 2015

(51) Int. Cl.
*G06F 3/14* (2006.01)
*G06T 7/00* (2017.01)
*G06F 3/01* (2006.01)
*H04L 12/58* (2006.01)
*G06T 7/70* (2017.01)

(52) U.S. Cl.
CPC ............ *G06F 3/1423* (2013.01); *G06F 3/013* (2013.01); *G06F 3/016* (2013.01); *G06T 7/70* (2017.01); *H04L 51/24* (2013.01); *G06T 2207/10016* (2013.01); *G06T 2207/10028* (2013.01)

(58) Field of Classification Search
CPC ........ G06F 3/1423; G06F 3/016; G06F 3/013; H04L 51/26; H04L 51/24; G06T 7/004; G06T 2207/10028; G06T 2207/10016
See application file for complete search history.

(56) References Cited

U.S. PATENT DOCUMENTS

| 7,743,340 B2* | 6/2010 | Horvitz | G05B 19/404 715/710 |
| 7,839,269 B2 | 11/2010 | Steger et al. | |
| 8,031,172 B2* | 10/2011 | Kruse | G06F 3/014 345/156 |
| 8,217,769 B2 | 7/2012 | Ullrich et al. | |
| 8,576,199 B1* | 11/2013 | Pryor | B60K 37/06 178/18.09 |

(Continued)

FOREIGN PATENT DOCUMENTS

| WO | 2006009972 A1 | 1/2006 |
| WO | 2011053474 A1 | 5/2011 |

OTHER PUBLICATIONS

Matt Peckham; "Look at your Wii U, Now Back t Me, Now Back to Your Wii U (I'm on a Horse!)"; Nov. 13, 2012; http://techland.time.com/2012/11/13/look-at-your-wii-u-now-back-to-me-now-back-to-your-wii-u-im-on-a-horse/.

*Primary Examiner* — Andrew Sasinowski
(74) *Attorney, Agent, or Firm* — Miles & Stockbridge, P.C.

(57) ABSTRACT

A notification manager is provided that manages notifications for a user. The notification manager detects a notification event and determines a context of the notification event. The notification manager determines a target device for the notification event based on the determined context and one or more available displays. The notification manager then generates a notification on one or more of the one or more available displays to direct the user's attention to the target device.

29 Claims, 4 Drawing Sheets

(56) References Cited

U.S. PATENT DOCUMENTS

| | | | |
|---|---|---|---|
| 8,694,901 B2* | 4/2014 | Falchuk | G06F 9/4443 |
| | | | 715/764 |
| 8,739,293 B2* | 5/2014 | Walker | G07F 9/023 |
| | | | 194/205 |
| 2002/0087649 A1 | 7/2002 | Horvitz | |
| 2004/0098462 A1 | 5/2004 | Horvitz et al. | |
| 2010/0215170 A1 | 8/2010 | Kannappan | |
| 2013/0147686 A1* | 6/2013 | Clavin | G06F 3/013 |
| | | | 345/8 |
| 2013/0222405 A1* | 8/2013 | Ademar | G06F 3/1423 |
| | | | 345/581 |

\* cited by examiner

HAPTIC NOTIFICATION MANAGER

FIELD

One embodiment is directed generally to a system, and, more particularly, to a system that manages notifications across multiple user devices.

BACKGROUND

Haptics is a tactile and force feedback technology that takes advantage of a user's sense of touch by applying haptic feedback effects (i.e., "haptic effects" or "haptic feedback"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of user notifications including haptic effects with certain events or alerts, such as receipt of an incoming message and an upcoming meeting reminder. User attention is increasingly divided between a variety of displays such as smartphones and laptops, and even head-mounted displays. However, these displays are typically unaware of each other and often compete for the user's attention. A game console, for example, may try to inform the user that a download is complete while his/her attention is devoted to the news on his/her smartphone. Users commonly receive concurrent and redundant notifications through a variety of devices in their immediate environment, such as an email notification on both a smartphone and a laptop, which may force the user to decide which display to use. This trend is likely to continue as wearable devices such as head-mounted displays and smart watches become more common. Receiving multiple notifications for the same event, however, can be unpleasant and distracting. Further, the device that ultimately manages to attract the user's attention may also not be the most appropriate for a given type of content or event.

SUMMARY

One embodiment is a system that manages notifications for a user. The system detects a notification event and determines a context of the notification event. The system determines a target device for the notification event based on the determined context and one or more available displays. The system then generates a notification on one or more of the one or more available displays to direct the user's attention to the target device.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a system that manages a user's notifications and uses haptic feedback to direct the user's attention to the most appropriate device to handle each notification.

Figure 1:
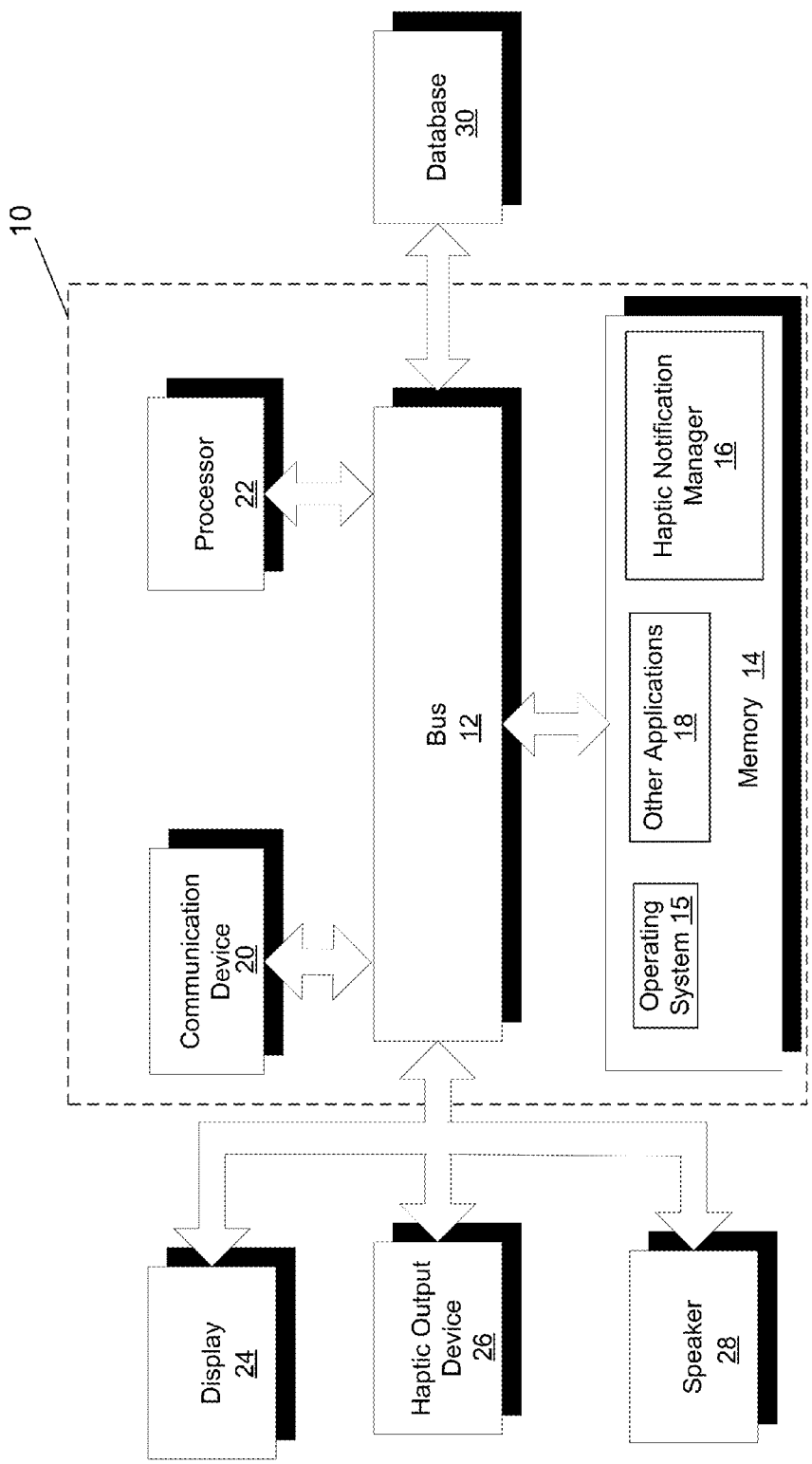
FIG. 1 illustrates a block diagram of a system in accordance with one embodiment of the invention.

FIG. 1 illustrates a block diagram of a system 10 in accordance with one embodiment of the invention. In one embodiment, system 10 is part of a haptic notification management device, and system 10 provides haptic notification manager functionality for the haptic notification management device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. Processor 22 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a haptic notification management device in one embodiment. The modules further include a haptic notification manager module 16 that manages various notifications, as disclosed in more detail below. In certain embodiments, haptic notification manager module 16 can comprise a plurality of modules, where each module provides specific individual functionality for managing notifications. System 10 will typically include one or more additional application modules 18 to include additional functionality.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10 further includes one or more haptic output devices 26. Processor 22 may transmit a haptic signal associated with a haptic effect to haptic output device 26, which in turn outputs haptic effects such as vibrotactile haptic effects, electrostatic friction haptic effects, or deformation haptic effects, in response to a drive signal. Processor 22 may transmit the actual haptic signal itself (i.e., haptic parameters) or an identity or functionality of the haptic effect so that a processor in each receiving haptic output device (e.g., a smart watch, computer, wearable, smartphone or other mobile device) can retrieve the haptic signal from memory or generate the haptic signal.

As is known in the art, different types of haptic effects can be generated by varying one or more of the haptic effect parameters such as magnitude, frequency or duration. Different types of haptic effects can also be generated by changing the type of actuator or other haptic output device that receives the motor signal and generates the haptic effects. For example, a haptic effect generated by an ERM actuator is a different type of haptic effect than one generated by an ESF device.

Haptic output device 26 in one embodiment is an actuator such as, for example, an electric motor, an electro-magnetic actuator, a voice coil, a linear resonant actuator, a piezoelectric actuator, a shape memory alloy, an electro-active polymer, a solenoid, an eccentric rotating mass motor ("ERM") or a linear resonant actuator ("LRA"), a high bandwidth actuator, an electroactive polymer ("EAP") actuator, an electrostatic friction display, or an ultrasonic vibration generator. In alternate embodiments, system 10 can include one or more additional actuators, in addition to haptic output device 26 (not illustrated in FIG. 1). In alternate embodiments, system 10 may not include haptic output device 26, and a separate device from system 10 includes an actuator, or other haptic output device, that generates the haptic effects, and system 10 sends generated haptic signals or notification signals to that device through communication device 20.

In addition to an actuator, haptic output device 26 may be a non-mechanical or non-vibratory device such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc. Multiple haptic output devices with multiple haptic effects can generate a haptic effect.

The generated haptic effects can include a wide range of effects and technologies, including vibrations, deformation, squeezing, poking, stretching, surface friction, heat, etc. A device that generates haptic effects, and includes haptic output device 26, can be a wearable device (e.g., a bracelet, armband, glove, jacket, vest, pair of glasses, shoes, belt, etc.), a handheld device (e.g., a mobile phone, computer mouse, etc.), haptically enabled furniture (e.g., a chair, couch, etc.) or any other haptically enabled device.

System 10, in one embodiment, further includes a speaker 28. Speaker 28 is used for embodiments where audio is generated on the same system. Otherwise, speaker 28 can be part of another device. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a database 30. Database 30 can be configured to provide storage for haptic notification manager module 16 and store haptic notification data, etc.

Figure 2:
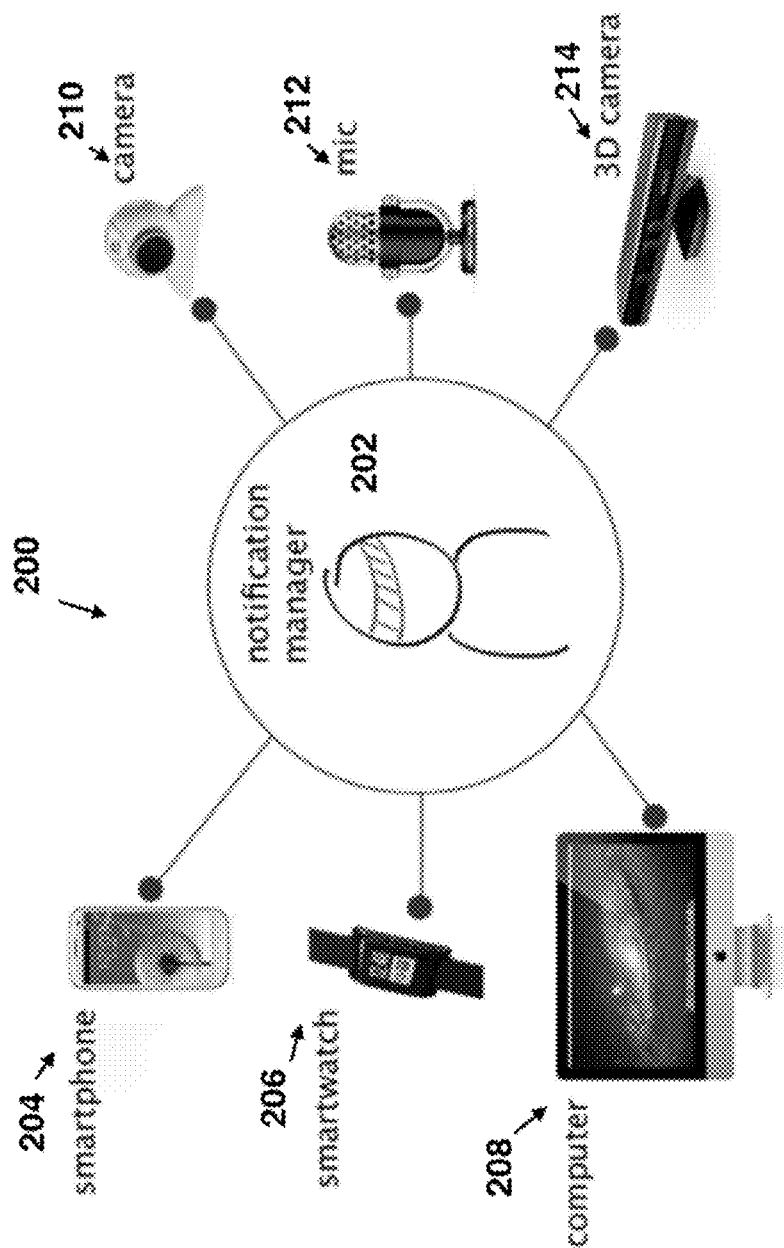
FIG. 2 illustrates a block diagram of a haptic notification system in accordance with one embodiment of the invention.

FIG. 2 illustrates a block diagram of a notification system 200 in accordance with one embodiment of the invention. Notification system 200 includes a notification manager 202, a smartphone 204, a smart watch 206, a computer 208, a camera 210, a microphone 212, and a three dimensional camera 214. Notification manager 202 can be implemented using haptic notification manager module 16 of FIG. 1. Some embodiments include one or more of 204-214. Some embodiments include one or more devices not shown in FIG. 2, such as laptops, tablets, game consoles, and televisions. Each device can include a notification output device, such as an actuator for generating a vibratory based haptic effect, a screen or display for generating a visual notification effect, a speaker for generating an audio notification effect, etc.

In operation, notification system 200 detects an event for which a user should be notified and generates haptic feedback on one or more devices (e.g., smartphone 204, smart watch 206, and computer 208, a tablet, a television, etc.) to direct the user's attention to computing devices and/or displays (e.g., smartphone 204, smart watch 206, and computer 208, a tablet, a television, etc.) to view content associated with the given event on the most appropriate device/display for the given event/content. The device on which the haptic feedback is generated or "displayed" can be the device to which the user's attention is directed, or the user's attention can be directed to a different device and/or display.

In some embodiments, the haptic feedback is controlled by notification manager 202, implemented, for example, as haptic notification manager module 16. In some such embodiments, notification manager 202 is integrated in a computing device that the user wears at all times or for significant amounts of time, such as a head-mounted display or smart watch (e.g., smart watch 206). Because, for example, wearable devices are typically continuously worn or are worn for long periods, wearable devices present an opportunity to manage the flow of notifications and attract the user's attention to the most appropriate device.

In some embodiments, notification manager 202 is integrated into a head mounted display such as Google Glass to manage notifications for an ecosystem of computing devices. In such embodiments, after receiving a notification request from one or more devices, notification manager 202 determines the most appropriate device to use based on the user's context and the specifics of the notification. In some embodiments, notification manager 202 directs the user's attention, for example, to a laptop when a long email has been received, but to a smartphone for a short text message or any other available "screen." Notification manager 202 can direct the user's attention, on the other hand, to the Google Glass display for short notifications that are irrelevant to a primary task, such as watching a movie on a television.

In some embodiments, notification manager 202 is capable of generating haptic effects on a variety of haptic displays to provide the required cueing information. For example, in some embodiments, notification system 200 includes a wearable device and the haptic displays are part of the notification system 200, worn on the user's body at other locations, or simply part of the devices in the user's environment (but under the control of notification manager 202) (e.g., smartphone 204, smart watch 206, etc.). The haptic effects can take the form of vibrations or other stimuli such as squeezing or poking.

In some embodiments, notification manager 202 provides haptic cueing in an intuitive manner. For example, directional cues can attract the user's attention towards the region of the field of view that includes the target device. In some embodiments, a vibration on the right temple of a head mounted display, for example, indicates that a laptop, to the right of the user, should be used to handle a notification. The location of the cue, similarly, could indicate which device should be used. In some embodiments, a vibration is produced on the haptic display that is the closest to the selected device. For example, a vibration on a wristband could suggest to reach out with that hand and grab a nearby smartphone.

In some embodiments, notification system 200 can generate haptic cues that are abstract, using a language that can be learned by the user. Different devices, for example, could be associated with distinct tactile icons. The complexity of a notification could also be encoded in a property of an effect, such as its length, thereby indicating whether computer 208 or smartphone 204 would be more appropriate. A long email, for example, could trigger a longer vibration, indicating that it would be more appropriate to direct the user to computer 208 as opposed to smartphone 204 to read the email.

In some embodiments, notification manager 200 produces haptic feedback in in a manner so that related notifications feel similar, regardless of which device generates the haptic feedback. For example, in one embodiment, email notifications that are directed to either a smart watch or smartphone could respectively be generated using a squeeze of the wrist or a vibration of the phone. In such embodiments, notification manager 200 can match the intensity and rhythm of the haptic effects to indicate that both notifications are related to emails.

In some embodiments, notification manager 202 manages notifications for an ecosystem of devices that the user has access to (e.g., smartphone 204, smart watch 206, and/or computer 208). In some embodiments, notification manager 202 is a device that a user wears at all times or for a long period of time, such as a smart watch or a head-mounted display (e.g., Google Glass). In some embodiments notification manager 202 is a smartphone since smartphones are often kept on the user's body (e.g., in a pocket) or within easy reach.

In some embodiments, notification manager 202 is a head-mounted display that acts as a central notification manager by communicating with different devices such mobile devices, wearables, computers, televisions as well as cameras, microphones and other context sensors.

In some embodiments, notification manager 202 determines the best modality or combination of modalities to use based on the notification type and the target display. For example, in such embodiments, when the user is currently looking at the target display, notification manager 202 determines visual feedback may be more appropriate than audio or haptic feedback when the visual feedback can be provided without distracting the user from his/her current task. In such embodiments, when the target display is in contact with the user's body, notification manager 202 can use haptic feedback for notifications. Similarly, when the target device is within easy reach of the user's hand, notification manager 202 can determine that haptic feedback on the wrist is the desired modality to attract the user's attention. In another example, when a device is far away and out of reach, notification manager 202 can cause a sound to be emitted on the device to attract the user's attention. It may also be possible to use a combination of modalities, with special consideration for timing. A vibration on the right-hand wrist, for example, could be followed by a faint audio beep or blinking light on a distant device within the right-hand side of the user's field of view. In such examples, the haptic feedback generated by notification manager 202 can attract the user's attention to a broad area, and the visual or audio feedback indicates the exact device that requires attention.

In some embodiments, notification manager 202 is at a remote site but in communication with devices in the user's vicinity. For example, in some embodiments, notification manager 202 is a cloud service that manages a user's notification streams to direct his/her attention to the most appropriate device. In some embodiments, notification manager 202 is distributed among the different devices in the user's environment such that no one device is in full control of notifications but that they all collaborate to attract the user's attention to the most appropriate device.

Figure 3:
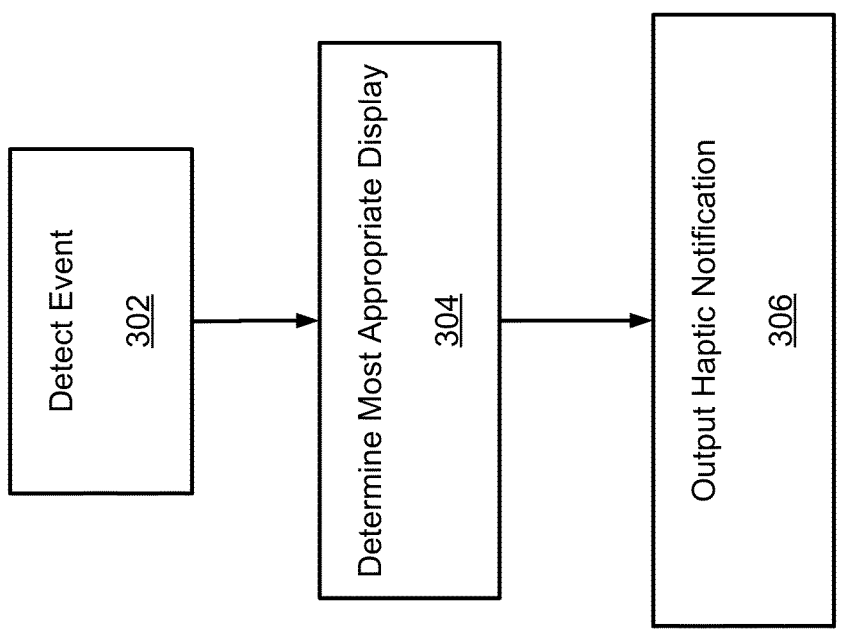
FIG. 3 illustrates a flow diagram of a haptic notification manager module, according to an embodiment of the invention.

FIG. 3 illustrates a flow diagram of haptic design functionality performed by a system, according to an embodiment of the invention. In one embodiment, the functionality of FIG. 3 is implemented by software stored in memory or other computer-readable or tangible media, and executed by a processor. In this embodiment, each functionality may be performed by a haptic notification manager module (such as haptic notification manager module 16 of FIG. 1). In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

According to the embodiment, the flow begins at 302, where a notification event is detected. Module 16 can detect the notification event, or module 16 can receive the notification event from a user device. In some embodiments, user devices such as 204-208 of FIG. 2 transmit notifications to module 16 which then manages the user notification, as discussed herein. Module 16 can analyze the detected notification event, user context, and available devices for haptic feedback and delivery of the notification. The flow proceeds to 304.

At 304, module 16 determines the most appropriate display to direct the user's attention to. Module 16 can intelligently determine how to correctly direct the user's attention. Module 16 can determine the most appropriate display for a given notification based on the context of the notification including, for example, the nature of the notification, the available displays, the current task/activity being performed by the user, the proximity of the available displays to the user, the privacy levels associated with the notification, and a pre-determined priority of the notification.

For example, in some embodiments, module 16 determines the nature of the notification or event that it relates to. Module 16 can connect to a database of possible events and associated probabilities of a device that is most appropriate to handle a given notification event, based either on general data or on learned data from the user's behavior. Module 16 can also perform artificial intelligence, such as determining the content of a text message using natural language processing or determining how an event relates to the user's current task or context.

In some embodiments, module 16 is aware of the devices available in the user's environment, such as computers, laptops, tablets, smartphones, smart watches, head-mounted displays, etc. Module 16 can determine and be aware of each device's current location relative to the user (and/or the available haptic displays). For example, module 16 can monitor the user's environment such that it is aware that the user is sitting in front of a computer with a smartphone to his/her right such that appropriate directional cues can be provided. In some embodiments, such monitoring is performed using computer vision techniques, for example by analyzing the video from a head-mounted display or 3D map from a depth camera, such as 3D camera 214. In some embodiments, such monitoring is performed by analyzing the signal strength of inter-device communications such as Bluetooth or Wi-Fi in order to determine the relative distance between devices. In some embodiments, such monitoring is performed in an instrumented environment that can determine their location (e.g., using indoor positioning technology).

In some embodiments, module 16 monitors and is aware of the tasks that the user is currently engaged in, and the current status of his/her attention. For example, in some embodiments, module 16 monitors the device ecosystem to determine which device is currently being interacted with, and what functionality it is currently performing. For example, module 16 determines that the user is typing in a Word document on computer 208 or watching a movie on a tablet. In some embodiments, module 16 also determines where the user is looking. Eye tracking technologies, for example, can be used to determine if the user is paying attention to a movie playing on a TV or to an e-book reader in his hands.

In some embodiments, module 16 is aware of devices that the user is currently in contact with, such as those with haptic feedback capabilities. Capacitive sensing, for example, can be used to determine that the user is resting his hands on a smartphone and therefore the user could receive haptic feedback through the smartphone.

In some embodiments, module 16 is aware of the privacy requirements relative to a notification and whether the different devices in a user's environment can support them. For example, a private text message could technically be displayed on a television or smartphone but may be more appropriate on the latter if others are also watching the television. In some embodiments, the user's environment is determined using sensors such as video camera 210 and computer vision algorithms.

In some embodiments, module 16 prioritizes notifications based on the current context and/or the nature of incoming notifications. In some embodiments, module 16 determines what haptic feedback will be used for a given notification, if any, based on the determined prioritization and which haptic device would be used for display. For example, module 16 may choose to attract the user's attention to a smartphone for an important phone call, and ignore a less important incoming email. Haptic feedback can also be selected based on the importance of the notification, such as a strong vibration for an important message. A notification could also be delayed to a more appropriate time. For example, the user could be notified of a non-urgent email only after he has taken care of an important phone call.

At 306, module 16 generates a haptic effect notification including a haptic effect that will attract the user's attention to the most appropriate device for the notification. In some embodiments, the haptic effect notification is produced by actuators that are embedded in the notification manager 202 itself, such as vibration actuators in the case of a head-mounted display. Additionally or alternatively, the haptic effect notification is produced by other haptic display devices (e.g., smartphone 204, smart watch 206, computer 208, a wearable or other mobile device) that notification manager 202 remotely controls, such as the vibration actuators in smart watch 206 and/or smartphone 204. The haptic effect notification produced can take any form, including vibration or deformation. Deformation can be particularly useful to provide notifications that are pleasant and not disruptive.

Each haptic effect can be defined by high level parameters including magnitude, frequency and duration. The haptic effect notification can include the actual haptic signal itself (i.e., haptic parameters) or an identity or functionality of the haptic effect so that a processor in each receiving haptic output device (e.g., smartphone 204, smart watch 206, computer 208, a wearable or other mobile device) can retrieve the haptic signal from memory or generate the haptic signal.

In one embodiment, the haptic effect parameters will be retrieved from local memory and converted to motor signals that are sent to an actuator or other type of haptic output device. The actuator will then generate a vibratory based haptic effect, or any other kind of haptic effect as discussed above. The haptic effect may be generated as soon as the identity or parameters of the haptic effect is/are received from notification manager 202, or the timing can be delayed for a pre-determined duration of time.

In some embodiments, module 16 generates the haptic effect to intuitively attract the user's attention in a specific direction, or towards a specific device. For example, vibration actuators on the two wrists could be used to direct the user's attention to the device closest to either hand. The device that requires the user's attention could also be the one that vibrates if it is in contact with the user's body. In some embodiments, the feedback is generated to naturally cause an appropriate reaction, such as moving the head towards the source of a vibration.

In some embodiments, notification manager 202 is configured to generate sequential feedback, sequential notifications, or haptic flow. In such embodiments, a wristband, for example, can have three actuators along the long axis of the arm. When activated in sequence, these actuators can create the perception of a flow towards the hand or shoulder. Such effects could be used to direct attention in a specific direction, such as, for example, toward a particular device. The timing of these effects could also indicate other properties. A rapid sequence, for example, could indicate that the target display is nearby while a slower sequence could indicate a distant display.

In some embodiments, module 16 generates a haptic effect that is more abstract and depends on learned associations between the feedback effects and their intent. For example, module 16 can generate different haptic effects to attract the user's attention to different devices such as a smart watch, smartphone, or computer.

The following examples are provided for illustration of the above described flow.

Example 1

Alice is walking to work when she receives a vibration on her smart watch. She quickly glances at her watch knowing that whatever needs her attention is not worth taking out her smartphone from her pocket. If she had received a long email that she could not read on her watch, her phone would have vibrated instead.

Example 2

Bob is watching a movie on his television but instead of paying attention to it, he's reading about the location where the movie was filmed on his smartphone. His notification manager chooses not to disturb him with a work email since it's not urgent and he's currently enjoying his free time. When he receives an important email from his wife, however, the notification is directed to his smartphone since that is where his attention is currently directed.

Example 3

Curtis is sitting at his computer when he receives a phone call from a friend. He could answer the phone call from his computer but he usually prefers to use his smartphone instead for longer conversations. Knowing this, and knowing that he usually has long conversations with this caller, his notification manager chooses to direct his attention to the phone that is resting on a table behind him. The manager uses an actuator to gently poke Curtis on his shoulder (i.e., an actuator equipped wearable such as a smart vest), causing him to turn around and see the phone flashing.

Example 4

Dan is working on his laptop when he feels a squeeze from his haptic bracelet on his right wrist. He reaches out with his right hand and grabs his nearby phone, on which a new text message has arrived.

Other embodiments can be used to direct a user's attention to different displays while in a vehicle, such as a car, truck, airplane, helicopter, motorcycle, etc. The displays can include devices that the driver or passengers bring with them into the vehicle, such as a head-mounted display (e.g., Google Glass), wearable devices (e.g., a fitness band or smart watch), and mobile devices (e.g., a smartphone or tablet). The displays can also include other devices in the vehicle such as a Global Positioning System ("GPS") based device attached to the dashboard, a display integrated with the dashboard, a rear-view mirror, a side-mirror or other locations in the vehicle, a heads-up display projecting information over the road, a radio, or any other device that can display a current state (e.g., a switch with an on/off indicator). Some specialized vehicles such as police cars, ambulances, fire trucks or taxis may also include specialized displays such as laptop computers, communication devices and fare meters that embodiments can direct a user's attention towards.

The attention cue for the vehicle embodiment, as with previously described embodiments, can be provided by haptic, audio or visual feedback. Haptic feedback can be provided by one of the previously described devices, such as a head-mounted display or a smart watch. It can also be provided by haptic actuators embedded in the vehicle, for example on the steering wheel, seat, armrest, headrest or any other location where the body of a driver or passenger may rest. These embodiments may include a mechanism that detects contact with the user's body, such as the location of the hands on the steering wheel. Haptic feedback can also be produced with a projected haptic actuator (e.g., air vortices or ultrasonic pressure waves) that is embedded in the vehicle. The feedback should attract attention to a specific display. A vibration of the right-hand side of the steering wheel, for example, could direct attention to the onboard infotainment system on the center console.

Further, in some embodiments the selected display for notifications that attract a user's attention can be specific to the needs of a vehicle and the traveling environment of the vehicle. For example, the notifications may provide information about a text message, an email, a change in route (or suggested change in route) due to traffic or accidents, or a change in a situation or an assignment for a specialized driver (e.g., fireman, taxi driver). These notifications could improve the driving experience and safety by making notifications less disruptive and by making getting important information more efficient while driving by causing the driver to immediately look at the optimal display.

Embodiments can be used either while driving or while the vehicle is stopped. Embodiments can be aware of this context and direct attention accordingly. Attention can be directed to a smartphone while stopped, for example, but can be directed to the center console instead while driving (or the notification could be queued for later). The notification manager could also be aware of the presence of multiple occupants in a vehicle and direct notifications to the most appropriate person. If a navigation system detects a change in traffic ahead, for example, it could direct the driver's attention to a short message on the vehicle's center console briefly indicating a change in route, while also directing a passenger's attention to a tablet where detailed information about the traffic conditions and alternative routes are shown.

Figure 4:
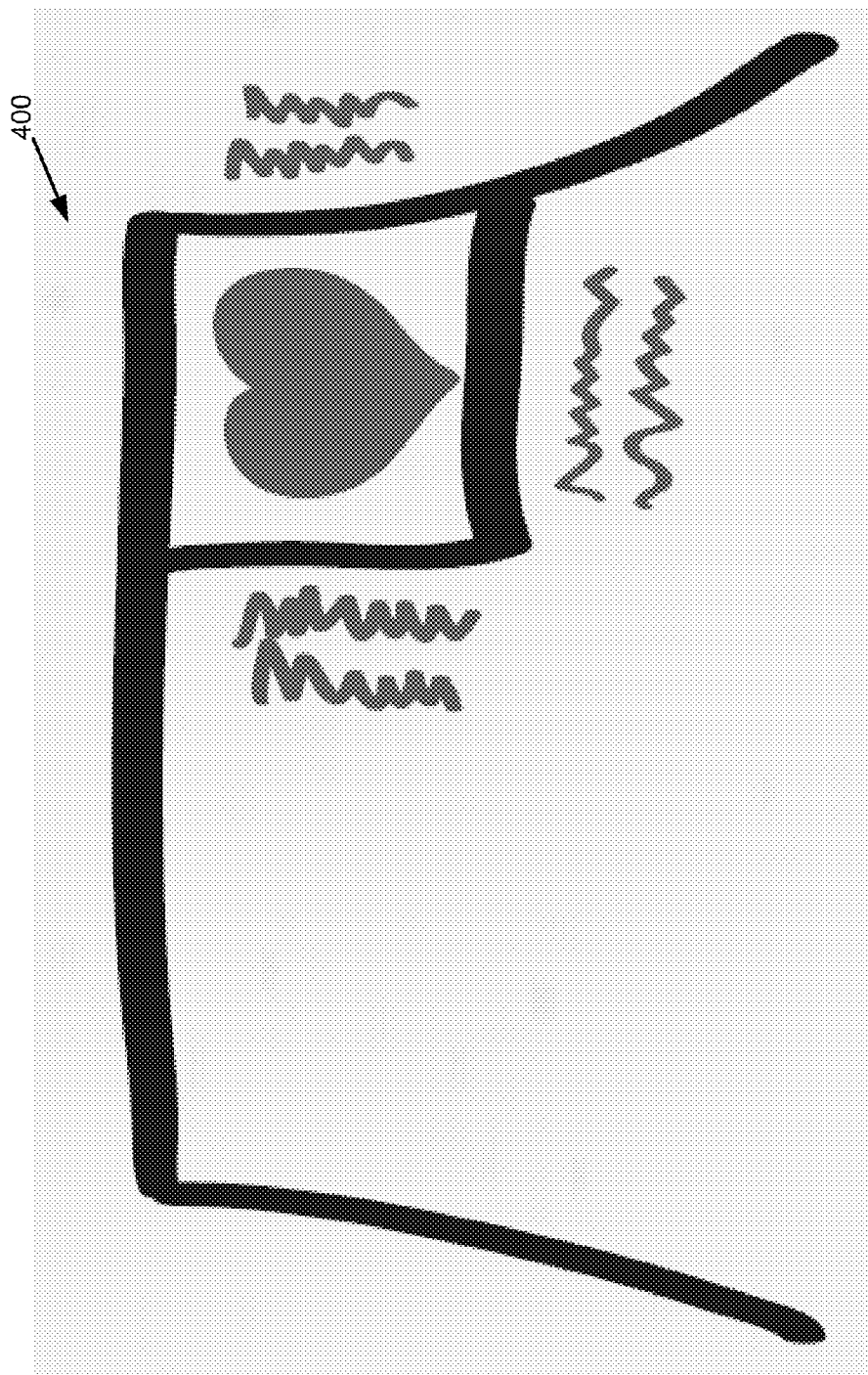
FIG. 4 illustrates an affective haptic notification in accordance with one embodiment of the invention.

FIG. 4 illustrates an affective haptic notification 400 in accordance with one embodiment of the invention. Affective haptic notification 400 includes an affective haptic effect to reinforce the emotional content of a message, such as someone "liking" or "disliking" a user's post on a social network (e.g., the "Path" application for Google Glass). The affective haptic effect is adapted to make the emotional content of a notification or message identifiable without requiring the user to view the content. For example, a first haptic effect type can be used to indicate a post was "liked" on a social network, and a second, different haptic effect type can be used to indicate a post was "disliked."

Affective haptic effects can be adapted to use the emotional reaction of users to different haptic effects. For example, a continuous, intense and high-frequency vibration is likely to be felt as annoying and unpleasant. On the other hand, a brief, subtle and low-frequency vibration is more likely to be felt as pleasant. Similarly, a slow and weak squeeze of the wrist is likely to be felt as pleasant, but a strong squeeze, a rapid sequence of sharp squeezes, while a sharp snapping squeeze is likely to have an unpleasant feeling. These emotional reactions can be associated to certain content, such as a positive or negative response to a post on a social network or the emotional state of a message's sender, and a notification manager, such as, for example, notification manager 200 of FIG. 2, can be configured to determine the associations and generate appropriate affective haptic effects based on the determined associations, as discussed above.

It will be appreciated that the notifications generated in the several embodiments specifically illustrated and/or described herein can include any combination of one or more of haptic, audio, and visual effects.

As disclosed, embodiments implement a notification manager that determines the most appropriate display for a user notification based on the context of the notification, and other factors. Thus, a user's attention can be directed to the most appropriate display for viewing the notification.

Several embodiments are specifically illustrated and/or described herein. However, it will be appreciated that modifications and variations of the disclosed embodiments are covered by the above teachings and within the purview of the appended claims without departing from the spirit and intended scope of the invention.

We claim:

1. A non-transitory computer-readable medium having instructions stored thereon that, when executed by a processor, cause the processor to manage user notifications, the managing comprising:
    identifying a plurality of different device types capable of providing a notification of an event occurrence;
    detecting a notification event;
    determining a context of the notification event;
    determining a target device from among the plurality of different device types to receive the notification event based on the determined context and the identified plurality of different device types; and
    generating a notification on a first directing device from among the identified plurality of different device types, the notification being an effect adapted to generate a cue to direct a user's attention to the target device, and the target device being different than the first directing device.

2. The computer-readable medium of claim 1, wherein the notification is a haptic effect adapted to generate a vibration as the cue to direct the user's attention to the target device.

3. The computer-readable medium of claim 1, wherein the notification is a visual effect adapted to generate a visual cue to direct the user's attention to the target device.

4. The computer-readable medium of claim 2, wherein the haptic effect is generated by an actuator.

5. The computer-readable medium of claim 1, wherein determining the context includes:
    determining a nature of the notification;
    determining one or more available displays;
    determining a current task being performed by the user;
    determining a proximity of each of the one or more available displays to the user;
    determining a privacy level associated with the notification event; and
    determining a priority of the notification event.

6. The computer-readable medium of claim 5, wherein determining the nature of the notification includes performing natural language processing.

7. The computer-readable medium of claim 5, wherein determining a current task being performed by the user includes performing eye-tracking to determine where the user's attention is being directed.

8. The computer-readable medium of claim 5, wherein determining a proximity of each of the one or more available displays to the user includes analyzing video from a head-mounted display.

9. The computer-readable medium of claim 5, wherein determining a proximity of each of the available displays to the user includes analyzing signal strength of inter-device communications to determine a relative distance between devices and performing indoor positioning in an instrumented environment.

10. The computer-readable medium of claim 1,
    wherein the generating a notification on the first directing device from among the identified plurality of different device types includes sequentially generating a first notification and a second notification respectively on the first directing device and a second directing device from among the identified plurality of different device types, and
    wherein the sequentially generating a first notification and a second notification includes generating a first effect and a second effect, collectively, adapted to generate a perception of flow in a directional path towards the target device as the cue to direct the user's attention to the target device.

11. The computer-readable medium of claim 1,
    wherein the generating a notification on the first directing device from among the identified plurality of different device includes generating a predefined common type of notification, and
    wherein the predefined common type of notification includes one or more predefined notifications adapted to provide a similar experience to the user when the one or more predefined notifications are generated on a plurality of different types of directing devices.

12. A computer-implemented method for managing user notifications, the computer-implemented method comprising:
    identifying a plurality of different device types capable of providing a notification of an event occurrences;
    detecting a notification event;
    determining a context of the notification event;
    determining a target device from among the plurality of different device types to receive the notification event based on the determined context and the identified plurality of different device types; and
    generating a notification on a first directing device from among the identified plurality of different device types, the notification being an effect adapted to generate a cue to direct a user's attention to the target device, and the target device being different than the first directing device.

13. The computer-implemented method of claim 12, wherein the notification is a haptic effect adapted to generate a vibration as the cue to direct the user's attention to the target device.

14. The computer-implemented method of claim 12, wherein the notification is a visual effect adapted to generate a visual cue to direct the user's attention to the target device.

15. The computer-implemented method of claim 13, wherein the haptic effect is generated by an actuator.

16. The computer-implemented method of claim 12, wherein determining the context includes:
    determining a nature of the notification;

determining one or more available displays;
determining a current task being performed by the user;
determining a proximity of each of the one or more available displays to the user;
determining a privacy level associated with the notification event; and
determining a priority of the notification event.

17. The computer-implemented method of claim 16, wherein determining the nature of the notification includes performing natural language processing.

18. The computer-implemented method of claim 16, wherein determining a current task being performed by the user includes performing eye-tracking to determine where the user's attention is being directed.

19. The computer-implemented method of claim 16, wherein determining a proximity of each of the one or more available displays to the user includes analyzing video from a head-mounted display.

20. The computer-implemented method of claim 16, wherein determining a proximity of each of the one or more available displays to the user includes analyzing signal strength of inter-device communications to determine a relative distance between devices and performing indoor positioning in an instrumented environment.

21. The computer-implemented method of claim 12, wherein the generating a notification on the first directing device from among the identified plurality of different device types includes sequentially generating a first notification and a second notification respectively on the first directing device and a second directing device from among the identified plurality of different device types, and
wherein the sequentially generating a first notification and a second notification includes generating a first effect and a second effect, collectively, adapted to generate a perception of flow in a directional path towards the target device as the cue to direct the user's attention to the target device.

22. The computer-implemented method of claim 12,
wherein the generating a notification on the first directing device from among the identified plurality of different device types includes generating a predefined common type of notification, and
wherein the predefined common type of notification includes one or more predefined notifications adapted to provide a similar experience to the user when the one or more predefined notifications are generated on a plurality of different types of directing devices.

23. A system, comprising:
a memory device storing a notification manager module; and
a processing device in communication with the memory device, the processing device executing the notification manager module stored in the memory device to manage user notifications, the managing comprising:
identifying a plurality of different device types capable of providing a notification of an event occurrence;
detecting a notification event;
determining a context of the notification event;
determining a target device from among the plurality of different device types to receive the notification event based on the determined context and the identified plurality of different device types; and
generating a notification on a directing device from among the identified plurality of different device types, the notification being an effect adapted to generate a cue to direct a user's attention to the target device, and the target device being different than the directing device.

24. The system of claim 23, wherein the notification is a haptic effect adapted to generate a vibration as the cue to direct the user's attention to the target device.

25. The system of claim 23, wherein the notification is a visual effect adapted to generate a visual cue to direct the user's attention to the target device.

26. The system of claim 24, wherein the haptic effect is generated by an actuator.

27. The system of claim 23, wherein determining the context includes:
determining a nature of the notification;
determining one or more available displays;
determining a current task being performed by the user;
determining a proximity of each of the one or more available displays to the user;
determining a privacy level associated with the notification event; and
determining a priority of the notification event.

28. The method of claim 12, wherein
the user is a target user of a plurality of users, and
the determining the target device comprises determining the target user from the plurality of users and selecting a device associated with the target user as the target device.

29. The method of claim 28, wherein
the plurality of users are occupants of a vehicle, and
the determining the target user from the plurality of users is based at least on a determination of a driver among the plurality of users.

* * * * *